United States Patent
Daoud

(10) Patent No.: US 6,448,496 B1
(45) Date of Patent: Sep. 10, 2002

(54) STRAIN RELIEF

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/500,741

(22) Filed: Feb. 9, 2000

(51) Int. Cl.⁷ .................................................. H02G 3/18
(52) U.S. Cl. ............................... 174/65 R; 174/65 SS; 285/161; 285/322
(58) Field of Search ...................... 174/65 SS, 65 R, 174/74 A, 84 C, 93; 285/161, 256, 257, 319, 322, 323, 331; 403/326, 329; 248/56, 57

(56) References Cited

U.S. PATENT DOCUMENTS

| | | | | |
|---|---|---|---|---|
| 4,145,075 A | * | 3/1979 | Holzmann | 285/322 |
| 4,250,348 A | * | 2/1981 | Kitagawa | 174/65 SS |
| 4,358,079 A | * | 11/1982 | Navarro | 248/56 |
| 4,375,011 A | * | 2/1983 | Grunau | 174/65 SS |
| 4,513,172 A | * | 4/1985 | Matsui | 174/65 SS |
| 4,600,803 A | * | 7/1986 | Holzmann | 174/65 SS |
| 4,767,135 A | * | 8/1988 | Holzmann | 285/322 |
| 4,787,657 A | * | 11/1988 | Henniger | 285/323 |
| 5,048,872 A | * | 9/1991 | Gehring | 285/322 |
| 5,336,850 A | * | 8/1994 | Mitsch | 174/65 SS |
| 5,350,204 A | * | 9/1994 | Henniger | 285/323 |
| 5,679,926 A | * | 10/1997 | Maloney et al. | 174/65 R |
| 5,927,892 A | * | 7/1999 | Teh-Tsung | 285/322 |
| 6,162,995 A | * | 12/2000 | Bachle et al. | 174/65 R |
| 6,199,920 B1 | * | 3/2001 | Neustadtl | 285/322 |
| 6,241,291 B1 | * | 6/2001 | Hui-Chen | 285/249 |
| 6,241,292 B1 | * | 6/2001 | Yang | 285/323 |

* cited by examiner

Primary Examiner—Dean A. Reichard
Assistant Examiner—Adolfo Nino
(74) Attorney, Agent, or Firm—Stroock & Stroock & Lavan LLP

(57) ABSTRACT

A new adapter and method for providing strain relief to and creating a liquid tight seal around a cable including a first nut with a tubular extension, the tubular extension having a plurality of deflectable arms, each of which are radically converged and constricted about a cable under a compression force caused by the tightening of a second nut having a tapered region formed in an inner nut channel.

4 Claims, 6 Drawing Sheets

STRAIN RELIEF

FIELD OF THE INVENTION

This invention relates to an adapter for providing strain relief to jacketed cables and for preventing moisture or water from damaging the cables. In particular, the invention is directed to a strain relief adapter connectable to the end of a cable conduit, such as a pipe, for securing jacketed cables of variable diameters carrying tip ring wire pairs to telephone junction boxes for distribution to telephone equipment. Further, the strain relief adapter is provided with a sleeve for sealing the adapter from moisture or water.

BACKGROUND OF THE INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs enter the building as part of a multi-conductor cable, the individual tip ring wire pairs must first be broken out from the cable into individual wire pairs. This is normally accomplished in a junction box known as, for example, a building entrance protector (BEP), or network interface unit (NIU).

The multi-conductor cables are generally enclosed in stiff insulation jackets having variable diameters depending upon the particular application. Because these multi-conductor cables carry the tip ring wire pairs that will be connected to various types of telephone equipment, it is necessary to provide strain relief to the cable to insure that the tip ring wire pairs do not become disconnected or loose. Loose or disconnected wires in a junction box can cause serious malfunctions in telephone, computer, or network service requiring costly repair and maintenance service. Moreover, it is desirable to provide a liquid tight seal to prevent moisture or water from invading the adapter and damaging the cable or wires within.

Thus, there is a need for an adapter capable of securing multi-conductor cables of variable diameters and providing a liquid tight seal.

SUMMARY OF THE INVENTION

The present invention is directed at overcoming shortcomings in the prior art. The present invention comprises a first nut connectable to an end of a cable conduit such that the cable carried within the conduit can be fed into and through the adapter. A tubular extension extends longitudinally from the base and has a compressible portion for constricting around and, thereby, securing a cable. A second nut is mountable over the tubular extension and has an inner channel provided with a tapered region for constricting the compressible portion of the tubular extension.

The operation of mounting the second nut over the tubular extension causes the tapered region of the second nut to exert a compression force on the compressible portion, which deflects the compressible portion inward. In use, the first nut is connected to a conduit carrying a cable and the cable to be strain relieved is passed through the tubular extension. The second nut is then mounted to the tubular extension to provide strain relief. As the compressible portion is deflected inward an inner surface of the compressible portion contacts the cable and grippingly secures the cable in place. Because the compressible portion can be gradually compressed by the second nut to a desired compression, a range of variable diameter cables can be secured by the present invention. Thus, the need to use cable fastening devices constructed for specific cable diameters is eliminated, thereby improving efficiency and reliability in cable connections.

In a preferred embodiment, the compression portion is comprised of a plurality of deflectable arms having gripping ends. Under a compression force, the gripping ends radially converge and secure the cable.

A second preferred embodiment further comprises a sleeve that is inserted into the tubular extension for providing a liquid tight seal. The sleeve conforms to the inner wall of the tubular extension and is tightly compressed against the cable when the second nut is mounted. Thus, the adapter prevents moisture or water from damaging the cable or the wires within.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the figures, which are not to scale, and which are merely illustrative, and wherein like reference numerals depict like elements throughout several views.

DETAILED DESCRIPTION OF THE PREFERRED EMBODIMENTS

Figure 2:
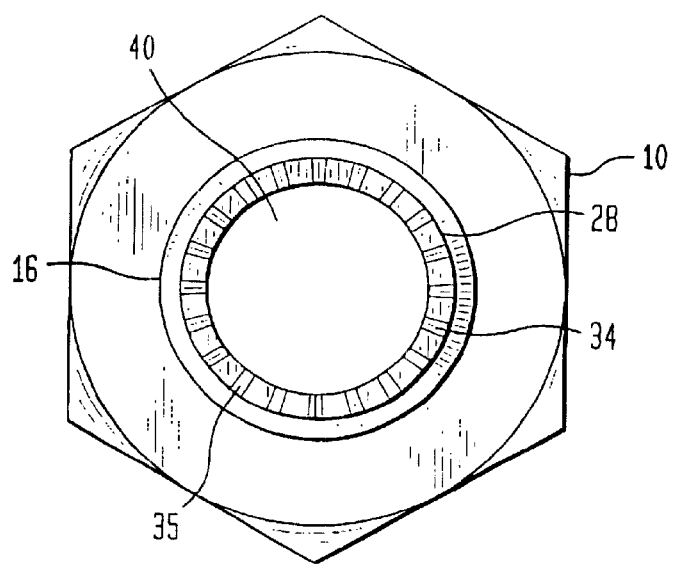
FIG. 2 is a top view of the first nut and tubular extension of the adapter in FIG. 1.
Figure 3:
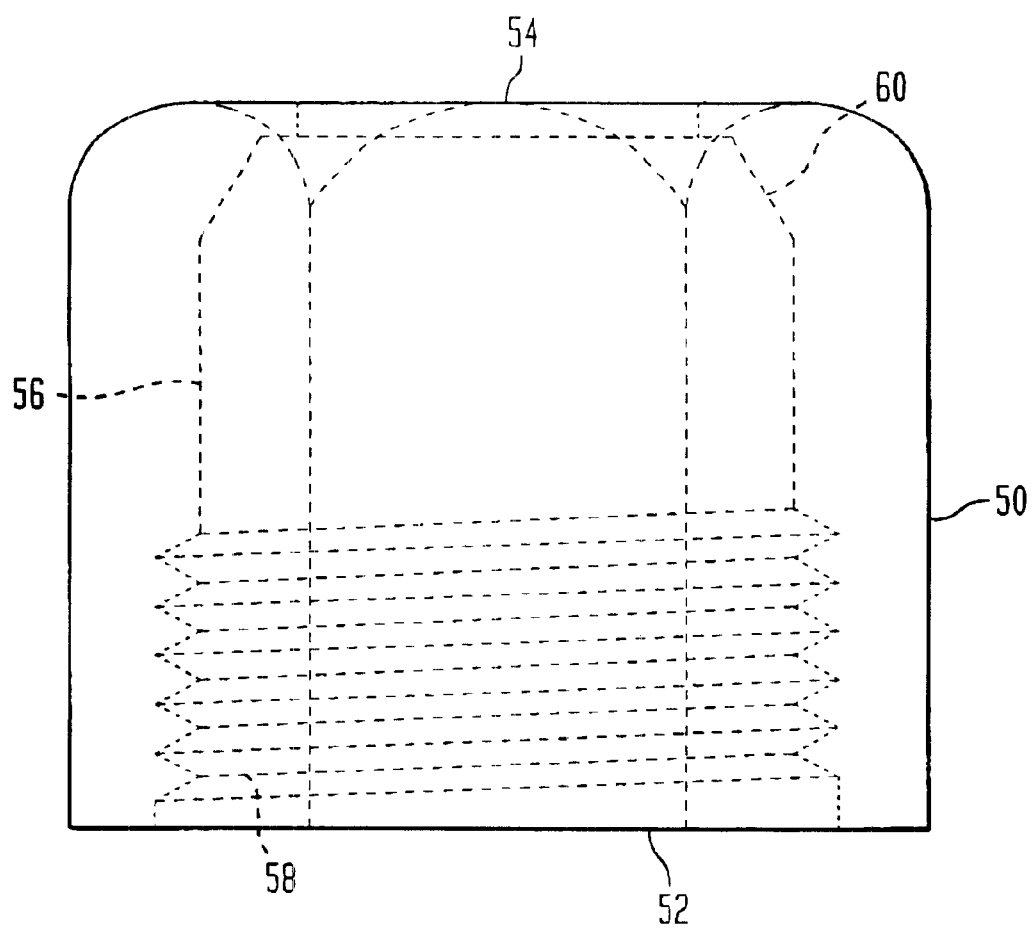
FIG. 3 is side view of the second nut of the adapter in FIG. 1.
Figure 4:
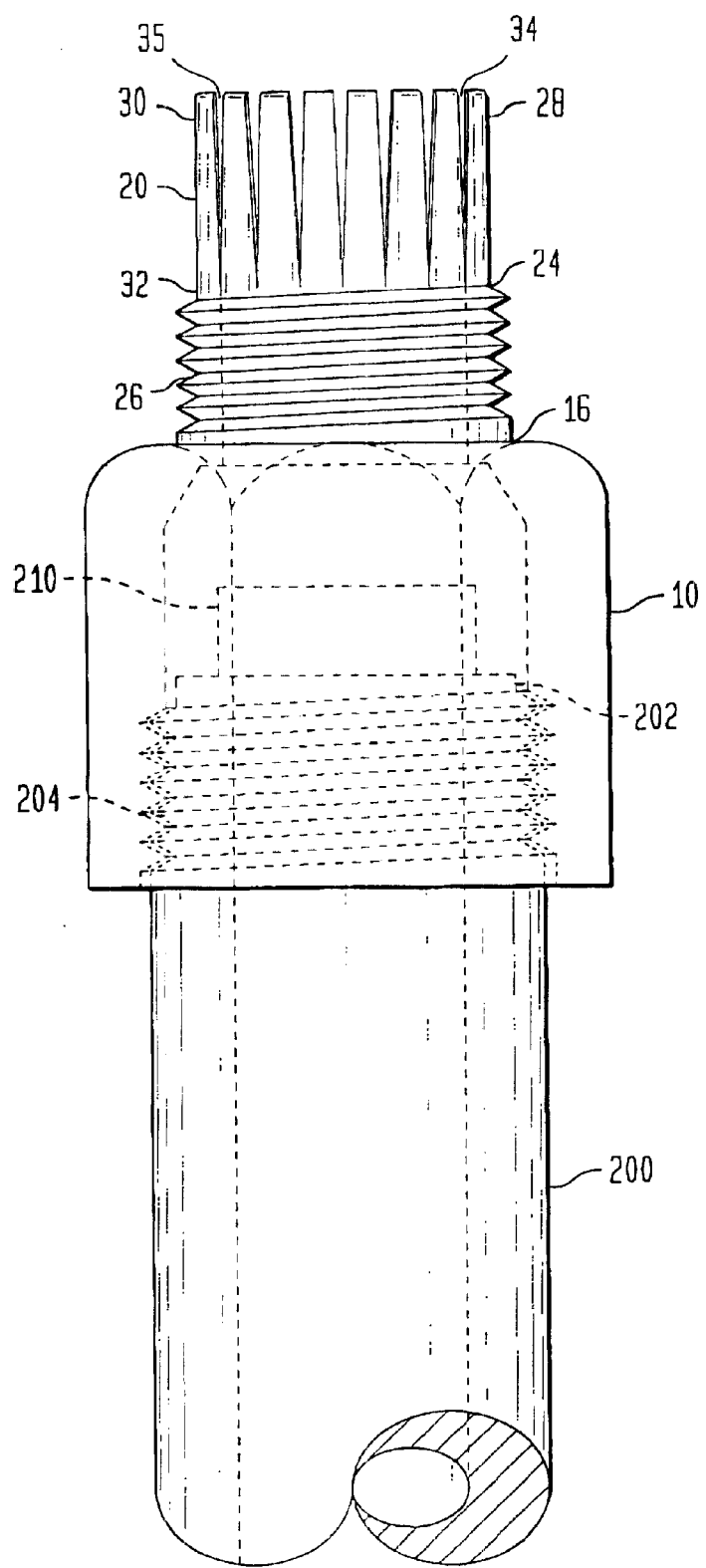
FIG. 4 is a side view of the adapter of FIG. 1 engaged with a conduit carrying a cable.

Referring to FIGS. 1 to 8, there is shown a strain relief adapter 1 constructed in accordance with the present invention. Adapter 1, which is fully depicted in FIGS. 5 and 6, comprises a first nut 10 constructed to be connectable to the end of a cable conduit, as shown in FIG. 4. A tubular extension 20 longitudinally extends from a second open end 16 of first nut 10. Tubular extension 20, preferably, has a male screw thread 26 on outer surface 24 and a compressible portion 28 for grippingly securing a cable.

Second nut 50, which is constructed to cause compressible portion 28 to grip a cable, has a female screw thread 58 formed on at least part of inner channel 56 located nearest first nut end 52. Female screw thread 58 is constructed to threadingly engage male screw thread 26 of tubular extension 20. Inner channel 56 is further provided with a tapered region 60 sloping inwardly towards second end 54. One skilled in the art will recognize that the present invention is capable of being utilized in any number of applications, such as, by way of non-limiting example, securing multi-conductor cable in BEPs or NIUs.

In a second embodiment, described further below, sleeve 80 is constructed to form fit to inner arm surfaces 35 of tubular extension 20, thereby further defining channel 40 of adapter 1. As will be described further, sleeve 80 creates a substantially liquid tight seal upon contact with a secured cable.

Figure 1:
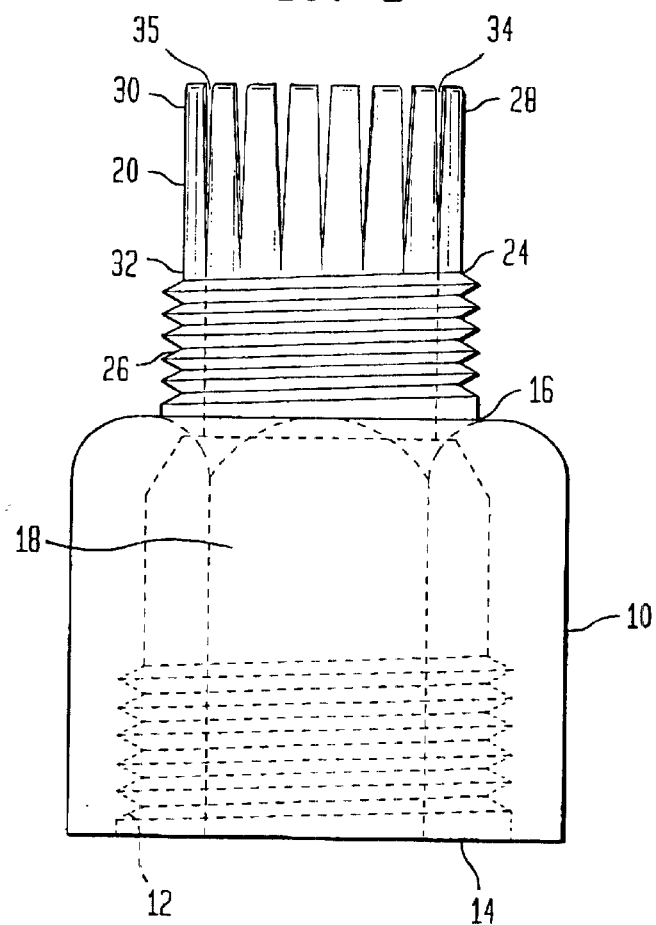
FIG. 1 is a side view of the first nut and tubular extension of a strain relief adapter in accordance with the present invention.

With reference to FIG. 1, there is shown a preferred embodiment of first nut 10 for use with the present invention. First nut 10 is preferably a hexagonal nut, although any type of nut generally known in the art may be utilized. First nut 10 is constructed to be connectable to the end of a cable conduit, such as, for example, a threaded pipe constructed to carry telephone or electrical wires (not shown). In a preferred embodiment, as depicted in FIG. 4, first nut 10 is provided with a first open end 14 into which the conduit or threaded pipe is matingly engaged with an internal female screw thread 12 formed on a portion of channel 18 nearest first open end 14. The cable carried within the engaged conduit is then fed into and through first nut channel 18 past second open end 16 into the compressible portion 28 of tubular extension 20. One skilled in the art will recognize, however, that first nut 10 may be connected to a conduit in any manner known in the art, including but not limited to, snap-fitting, friction fitting, adhesive, and the like.

With further reference to FIG. 1, first nut 10 is provided with tubular extension 20, which longitudinally extends from second open end 16 of first nut 10. Tubular extension 20 preferably has a male screw thread 26 on outer surface 24. Male screw thread 26 is constructed to matingly engage internal female screw thread 58 of second nut 50, as discussed further below. One skilled in the art will recognize, however, that mounting second nut 50 over tubular extension 20 via the mating engagement of threaded regions is but one manner in which the mounting may be accomplished. Second nut 50 may, by way of non-limiting example, be snap-fit, friction fit, or fit in any other way to achieve the compression of compressible portion 28 and the securement of second nut 50 over tubular extension 20.

Tubular extension 20 preferably is formed of a durable, flexible material, such as plastic. Tubular extension 20 is provided with compressible portion 28 for securing a cable or conduit. In a preferred embodiment, compressible portion 28 comprises a plurality of deflectable arms 30 extending from tubular extension 20. Each arm 30 is tapered such that each arm is wider at base 32 and thinner at gripping end 34. The taper results in ends 34 being freely spaced.

With further reference to FIG. 2, arms 30 are preferably arranged and equidistant from one another to ensure even gripping forces. Inner arm surfaces 35 of arms 34 collectively define gripping channel 40, which determines the boundaries of the relative diameter of compressible portion 28 in a compressed and uncompressed state. Because gripping ends 34 are freely spaced gripping ends 34 are free to deflected inward, causing compressible portion 28 to constrict around and grip a cable. Although not depicted in the drawings, one skilled in the art will recognize that gripping ends 34 may, for example, be provided with non-flat surfaces, such as grooved or notched surfaces to increase the gripping force exerted on a cable.

With reference to FIG. 3, there is shown a preferred embodiment of second nut 50 for use with the present invention. Second nut 50 is preferably a hexagonal nut, although any type of nut generally known in the art may be utilized. Second nut 50 preferably has a first open end 52 allowing second 50 to be mounted over tubular extension 20 and a generally cylindrically-shaped inner channel 56. As stated above, second nut 50 may be fit over tubular extension 20 in any manner that achieves compression and securement. Inner channel 56 is provided with an internal female screw thread 58 nearest to first open end 52 for engagement with the corresponding male screw thread 26 of tubular extension 20. Inner channel 56 is further provided with a tapered region 60 nearest to second end 54 and adjacent to female screw thread 58. Tapered region 60 slopes inwardly towards second end 54. The particular angle of slope of tapered region 60 is a matter of design choice and is subject to the specific application for which the present invention is utilized.

With reference now to FIG. 4, there is shown strain relief adapter 1 connected to conduit 200. Conduit 200 carries within a cable 210 which in turn holds a plurality of wires. As previously stated, one skilled in the art will recognize that first nut 10 may be connected to conduit 200 in any manner known in the art, including but not limited to, snap-fitting, friction fitting, adhesive, and the like. Further, conduit 200 and strain relief adapter 1 may be integrally formed. In use, upon connection of first nut 10 to an end 202 of conduit 200 through the mating engagement of screw thread 12 of first nut 10 and screw thread 204 of conduit 200, cable 210 can be fed into tubular extension 20 for securement.

Conduit 200 is an exemplary embodiment, since adapter 1 can be mounted to any surface formed to receive it. Thus, adapter 1 can be mounted or formed on conduits, enclosures, wire panels, distribution frames, or any other surface portion of a structure adapter to receive or pass cables, wires or other elongate members.

Figure 5:
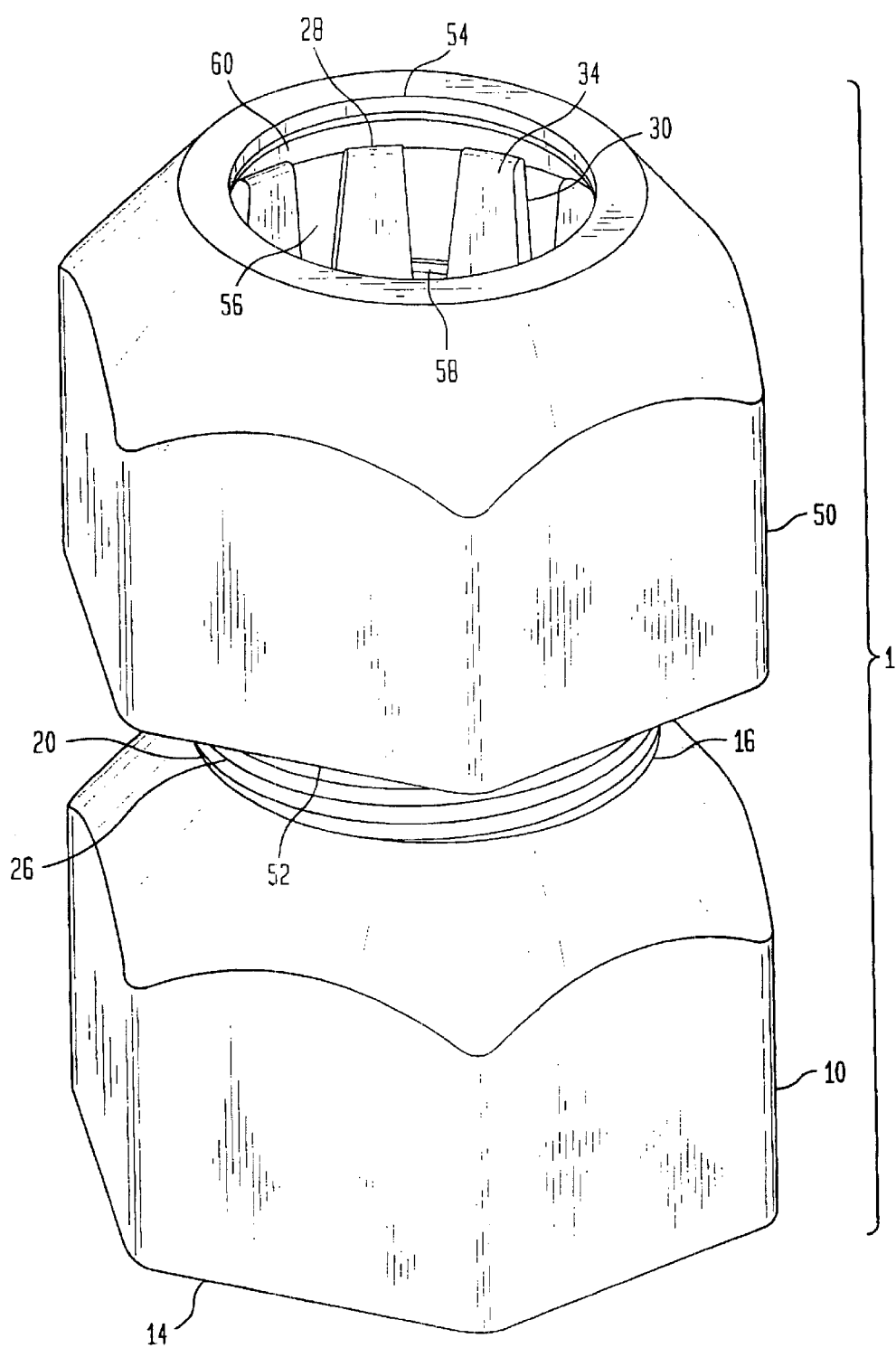
FIG. 5 is an isometric view of the adapter in FIG. 1, wherein the compressible portion is in an uncompressed state.
Figure 6:
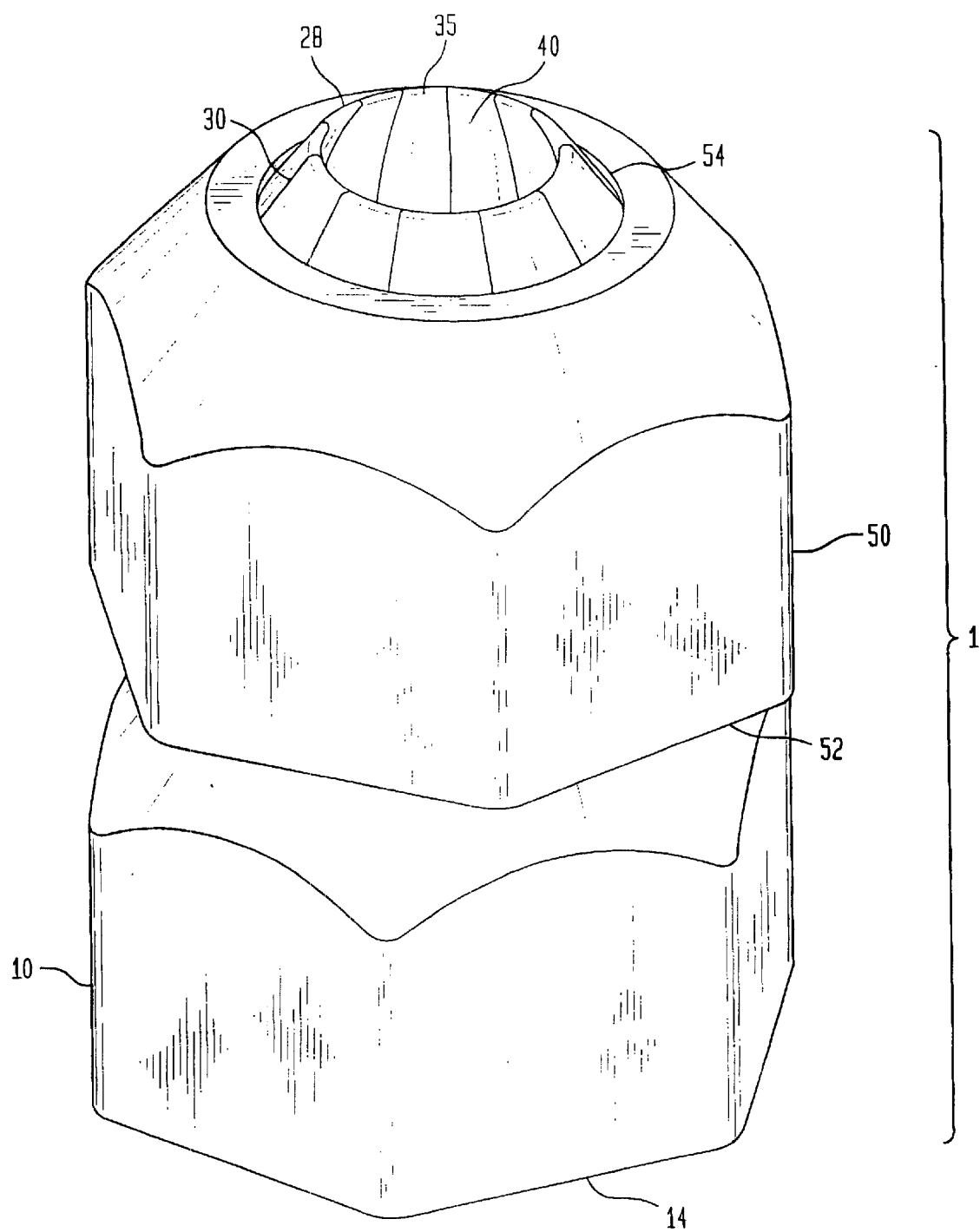
FIG. 6 is an isometric view of the adapter in FIG. 1, wherein the compressible portion is in a fully compressed state.

With reference now to FIGS. 5 and 6, there is shown second nut 50 mounted onto tubular extension 20 through the mating engagement of female screw thread 58 of second nut 50 with male screw thread 26 of tubular extension 20. As depicted in FIG. 4, second nut 50 is in a first position wherein the plurality of deflectable arms 30 of compressible portion 28 are in an uncompressed state. In an uncompressed state, channel 40, which is defined by the plurality of deflectable arms 30, is at its maximum diameter. In this state, a cable or conduit, as shown in FIG. 4, may be slid into and through channel 40, although it is not necessary for channel 40 to be at its maximum diameter for a cable to be fed into channel 44. As second nut 50 is tightened, gripping ends 34 contact tapered region 60 forcing gripping ends 34 to converge radially inward. This inward deflection results in the gradual decrease in the diameter of channel 40. As depicted in FIG. 5, when second nut 50 is fully tightened, deflectable arms 30 of compressible portion 28 are fully constricted and the diameter of channel 40 is at a minimum. The gradual convergence of gripping ends 34 and the reduction in diameter of channel 40 causes gripping ends 34 to make gripping contact with the inserted cable or conduit, thereby securing the cable or conduit.

Because the tightening of second nut 50 causes compressible portion 28 to gradually compress until reaching a fully compressed state, a multitude of cable diameters can be secured by adapter 1. The diameters of cables used with the present invention can range from the maximum diameter of channel 40 in an uncompressed state to the minimum diameter of channel 40 in a fully compressed state. One skilled in the art will recognize, however, that the respective compressed and uncompressed diameters of channel 40 are a matter of design choice and may be varied to accommodate difference ranges of cable diameters depending upon the particular application.

Figure 7:
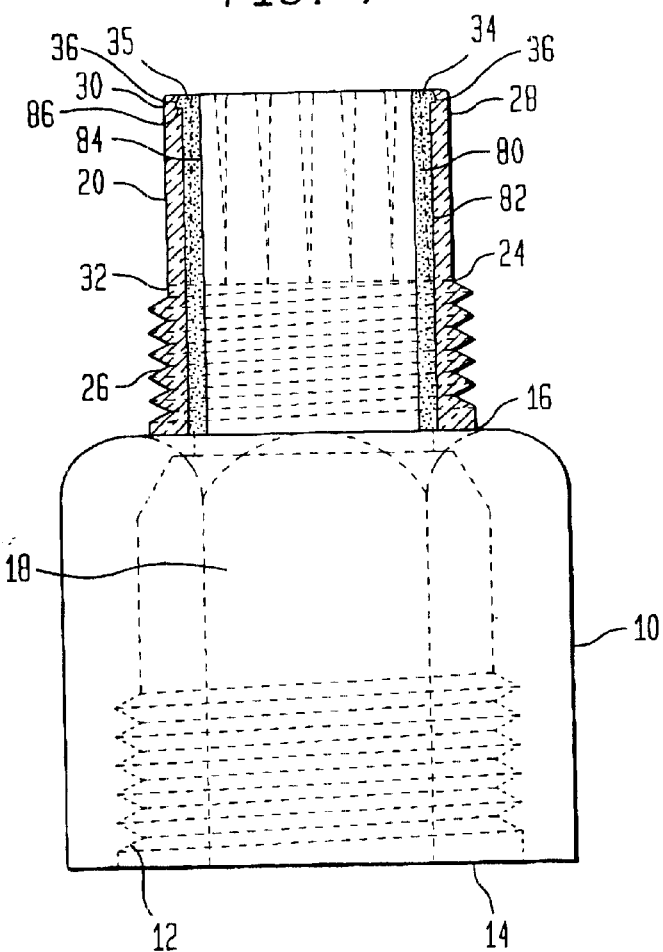
FIG. 7 is a side view of the adapter of FIG. 1, wherein a sleeve is shown.
Figure 8:
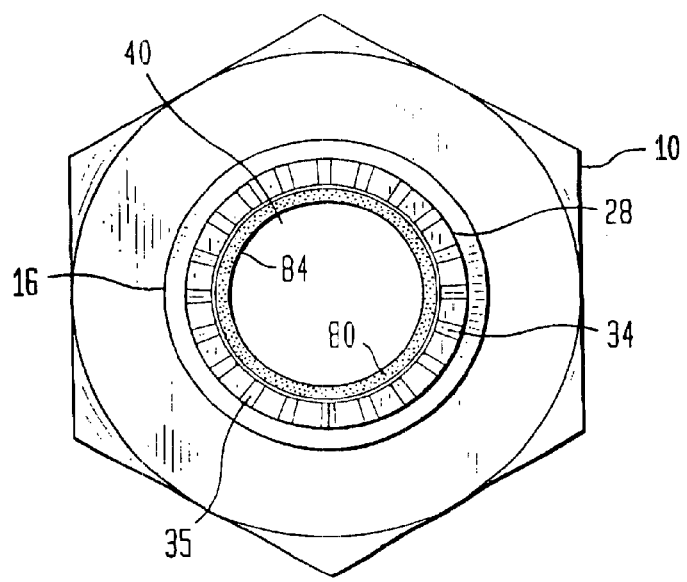
FIG. 8 is a top view of the adapter of FIG. 1, wherein a sleeve is shown.

With reference now to FIGS. 7 and 8, there is shown a second embodiment of the present invention wherein sleeve 80 is positioned inside tubular extension 20 for creating a substantially liquid tight seal. Sleeve 80 is preferably substantially cylindrical in shape and constructed of a flexible rubber-type material best suited to sealingly mold to a cable or conduit. One skilled in the art will recognize that sleeve 80 may be constructed from any material known in the art capable of creating a liquid tight seal around a cable or conduit. Outer surface 82 of sleeve 80 conforms to an inner arm surfaces 35 and further defines channel 40, such that sealing portion 84 of sleeve 80 mirrors the minimization of channel 40 under a compression force.

In use, the inward convergence of deflectable arms 30 forces sealing portion 84 to contact the cable or conduit. The contact between sleeve 80 and the outer surface of the cable or conduit creates a substantially liquid tight seal for preventing moisture or water from penetrating adapter 1. The seal ensures that the wires carried within the cable are not damaged. Further, the friction created between sealing portion 84 of sleeve 80 and the cable provides an additional measure of strain relief.

With further reference to FIG. 7, a preferred embodiment is shown wherein arms 30 are provided with a notch 36 and sealing portion 84 of sleeve 80 is provided with lip 86. Lip 86 meshes with notch 36 to prevent sleeve 80 from becoming dislodged. Furthermore, the meshing action of lip 86 and notch 36 ensures that, as arms 30 are deflected inward, sealing portion 84 is constricted around the cable.

Further, one skilled in the art will recognize that strain relief device 1 is not limited to the uses described herein, but may be used in applications pertaining to any field where there is a need to secure cables or other elongate members.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A strain relief adapter, comprising:

a first nut having a first open end and a second open end;

a tubular extension extending longitudinally from said second open end of said first nut, said tubular extension having a compressible portion comprising a plurality of tapered arms inwardly deflectable under a compression force, each of said plurality of arms having a gripping end;

a second nut having an inner channel, said inner channel having a tapered region; and a sleeve fit into and conforming to an inner surface of said compressible portion of said tubular extension, such that upon mounting said second nut over said tubular extension, said compressible portion and said sleeve are constricted to secure and seal a cable insertable into said tubular extension;

wherein said gripping end has a notch and an end of said sleeve has a lip constructed to engage said notch of said gripping end.

2. The adapter of claim 1, wherein said tubular extension has a threaded portion on an outer surface and said inner channel of said second nut is at least partially threaded to matingly engage said threaded portion of said tubular extension.

3. A method for grippingly securing and sealing a cable, comprising the steps of:

connecting a strain relief adapter to a surface, said strain relief adapter having a first nut, a tubular extension extending from said first nut, and a sleeve having a lip and conforming to an inner surface of said tubular extension, said tubular extension having a plurality of tapered, deflectable arms, each of said plurality of tapered, deflectable arms having a gripping end;

inserting a cable into said tubular extension; and tightening a second nut over said tubular extension, such that a tapered region formed on an inner channel of said second nut forces said deflectable arms and said sleeve to constrict around and seal said cable wherein a notch of said gripping end of said deflectable arms engages said lip of said sleeve.

4. A conduit, comprising:

a compressible portion positioned at a first end of said conduit;

a nut mountable over said compressible portion, said nut having an inner channel with a tapered region for compressing said compressible portion around a cable carried within said conduit and fed into said compressible portion; wherein said compressible portion further comprises a plurality of tapered arms inwardly deflectable under a compression force, each of said plurality of arms having a gripping end;

a sleeve fit into and conforming to an inner surface of said compressible portion of said conduit, such that upon mounting said nut over said compressible portion, said compressible portion and said sleeve are constricted to secure and seal the cable;

wherein said gripping end has a notch and an end of said sleeve has a lip constructed to engage said notch of said gripping end.

* * * * *